(12) United States Patent
Wang et al.

(10) Patent No.: US 8,798,657 B2
(45) Date of Patent: Aug. 5, 2014

(54) METHOD AND DEVICE FOR TRANSMITTING MULTIMEDIA BROADCAST MULTICAST SERVICE CONTROL INFORMATION

(75) Inventors: Bin Wang, Shenzhen (CN); Wei Gou, Shenzhen (CN); Zijiang Ma, Shenzhen (CN); Lei Mao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 39 days.

(21) Appl. No.: 13/696,265

(22) PCT Filed: Apr. 21, 2011

(86) PCT No.: PCT/CN2011/073125
§ 371 (c)(1),
(2), (4) Date: Nov. 5, 2012

(87) PCT Pub. No.: WO2011/147237
PCT Pub. Date: Dec. 1, 2011

(65) Prior Publication Data
US 2013/0055318 A1    Feb. 28, 2013

(30) Foreign Application Priority Data

May 26, 2010 (CN) .......................... 2010 1 0186933

(51) Int. Cl.
*H04W 4/06*   (2009.01)
*H04W 72/12*  (2009.01)
*H04W 4/12*   (2009.01)
*H04W 72/00*  (2009.01)

(52) U.S. Cl.
CPC ............ *H04W 72/1289* (2013.01); *H04W 4/12* (2013.01); *H04W 4/06* (2013.01); *H04W 72/005* (2013.01)
USPC ..... 455/510; 455/511; 455/412.2; 455/414.1; 455/422.1

(58) Field of Classification Search
CPC ....... H04W 4/06; H04W 4/12; H04W 72/005; H04W 72/1289
USPC ................. 455/510, 511, 412.2, 414.1, 422.1
See application file for complete search history.

(56) References Cited

U.S. PATENT DOCUMENTS

2004/0228294 A1* 11/2004 Kim et al. ...................... 370/312
2005/0090278 A1*  4/2005 Jeong et al. .................... 455/525

(Continued)

FOREIGN PATENT DOCUMENTS

| CN | 101370166 A | 2/2009 |
| CN | 101651489 A | 2/2010 |
| KR | 20090028447 A | 3/2009 |

*Primary Examiner* — Khai M Nguyen
(74) *Attorney, Agent, or Firm* — Porter Wright Morris & Arthur, LLP

(57) ABSTRACT

The present invention discloses a method and a device for transmitting multimedia broadcast multicast service control information. The method comprises: a base station stopping transmission of an MBMS service in a cell, and transmitting control plane information of the MBMS service, wherein, in the control plane information, contents of an SIB2, MCCH information and DSI remain unmodified, and contents of an SIB13 are modified or remain unmodified. The device comprises: a service stopping unit, configured to stop transmission of an MBMS service in a cell; a transmitting unit, configured to transmit control plane information of the MBMS service in the cell in which the MBMS service is stopped, wherein in the transmitted control plane information, contents of an SIB2, MCCH information and DSI remain unmodified, and contents of an SIB13 are modified or remain unmodified. The present invention improves reliability of receiving an MBMS service by a UE.

18 Claims, 5 Drawing Sheets

(56) References Cited

U.S. PATENT DOCUMENTS

| | | | |
|---|---|---|---|
| 2005/0185620 A1* | 8/2005 | Lee et al. | 370/331 |
| 2006/0068793 A1* | 3/2006 | Van Lieshout et al. | 455/444 |
| 2007/0218927 A1* | 9/2007 | Kuo | 455/466 |
| 2008/0268878 A1* | 10/2008 | Wang et al. | 455/458 |
| 2008/0311926 A1* | 12/2008 | Fischer et al. | 455/452.1 |
| 2010/0111058 A1* | 5/2010 | Fischer | 370/338 |
| 2011/0243056 A1* | 10/2011 | Jen | 370/312 |

* cited by examiner

| | Cell under control of eNB1 | | Cell under control of eNB2 | | Cell under control of eNB3 |

MBMS GW: MBMS Gateway
MCE: Multi-cell/multicast coordination entity

M1: user plane interface
M2: E-UTRAN internal control plane interface
M3: control plane interface between E-UTRAN and EPC

METHOD AND DEVICE FOR TRANSMITTING MULTIMEDIA BROADCAST MULTICAST SERVICE CONTROL INFORMATION

FIELD OF THE INVENTION

The present invention relates to a technology for transmitting multimedia broadcast multicast service control information, and in particular to a method and a device for transmitting multimedia broadcast multicast service control information in a Multicast Broadcast Single Frequency Network (MBSFN).

BACKGROUND OF THE INVENTION

With the rapid development of Internet and the popularization of multifunctional large-screen mobile phone, a large number of mobile data multimedia services and various high bandwidth multimedia services, such as video conference, television broadcast, video on demand, video advertisement, online education and interactive game, emerge. The multimedia services not only meet the increasing demand for services of mobile users, but also bring new business growth point for the mobile operators. These mobile data multimedia services require that multiple users are able to receive the same data at the same time, and compared with the common data services, are featured with large data volume, long lasting time and sensitive time delay, etc. In order to effectively utilize mobile network resources, the 3rd Generation Partnership Project (3GPP) presents a Multimedia Broadcast Multicast Service (MBMS) which is a technology of transmitting data from one data source to multiple targets, realizing sharing of network (comprising core network and access network) resources, and improving utilization ratio of network resources (especially air interface resources). The MBMS service defined by the 3GPP can realize multicast and broadcast of low-rate plaintext message as well as multicast and broadcast of high-speed multimedia services, thereby providing various abundant video, audio and multimedia services. This definitely complies with the development trend of mobile data in future and provides better service prospect for development of the 3rd Generation (3G) digital communication.

At present, the MBMS service is introduced in a Long Term Evolution (LTE) system. The MBMS service carries control signalling through a Multicast Control Channel (MCCH) and carries MBMS service data to be transmitted through a Multicast Traffic Channel (MTCH). The MCCH and MTCH divide area based on the MBSFN Area, wherein the MBSFN area consists of a series of cells. Specifically, one MBSFN area comprises one or more cells under the control of base station (eNB). FIG. 1 shows a structural diagram of the MBSFN area in the related art. As shown in FIG. 1, for example, one MBSFN area comprises 19 cells, wherein eNB1 controls the cells 1, 2, . . . , 6; eNB2 controls the cells 7, 8, . . . , 13; and eNB3 controls the cells 14, 15, . . . , 19. As shown in FIG. 1, the 19 cells in the circle compose one MBSFN area.

Given that in the related art, the control signalling and service data of the MBMS service are transmitted through MBSFN synchronous transmission in the whole MBSFN area, so as to enable a User Equipment (UE) to obtain corresponding combination gain during receiving. The MBSFN transmission requires each cell in the MBSFN area to transmit the same data content on the same time-frequency resource, which needs to perform unified scheduling and planning to the resources of each cell. At present, a Multi-cell/multicast Coordination Entity (MCE) network element is utilized to perform unified scheduling and planning for radio resources in the related art, specifically referring to the international standard 3GPP 36.300 v910.

Specifically, one MCE controls transmission of the MBMS service in the whole MBSFN area, that is, the MCE determines control information and service information of the MBMS service transmitted on the MBSFN subframe in the MBSFN area. The eNB executes instruction of the MCE, and completes transmission of the control information and service information of the MBMS service of each cell under its control.

The MCE configures multicast resources (MBSFN subframe and MBSFN frame) of the MBMS services (MTCH) and control signalling (MCCH) born by one MBSFN area. Multiple eNBs (such as eNB1, eNB2 and eNB3 in FIG. 1) under coverage of the MCE configure these multicast resources to all cells (such as cells 1, 2, . . . , 19 in FIG. 1) through system broadcast messages. At the same time, a Broadcast Multicast Service Centre (BM-SC) also transmits the MBMS service data to multiple eNBs (such as eNB1, eNB2 and eNB3 in FIG. 1) in the MBSFN area through an MBMS Gateway (MBMS-GW). FIG. 2 shows a logical diagram of an MBMS service bearing architecture in the related art. As shown in FIG. 2, usually, BM-SC→MBMS-GW→eNB is called user plane data transmission which is used for transmitting the MBMS service data, and the MTCH is adopted for the transmission. BM-SC→MBMS-GW→MCE→eNB is called control plane signalling transmission which is used for configuring control parameters, such as multicast resources, and system information and the MCCH are adopted for the transmission.

The UE can acquire the configuration information of the MCCH in the cell, such as the MCCH Modification Period (MCCH MP), the MCCH Repeat Period (MCCH RP) and other corresponding parameters in the cell, through System Information Block (SIB) 13 of a Broadcast Control Channel (BCCH).

The MTCH is a logical channel. One MTCH bears data of one or more services (for example, one Television (TV) program is one service), and one service is only born in one MTCH. The MTCH is mapped to a Multicast Channel (MCH) for transmission. One or more MTCHs can be mapped to one or more MCHs, that is, multiple MBMS services can be mapped to one MCH.

In the process of transmitting the MBMS service, the application of uplink feedback is also an important function in the related art. The uplink feedback means to report, through an uplink feedback channel, some state attributes of the UE which is receiving or is going to receive the MBMS service to the network side through triggering of the network side or through active reporting of the UE itself. Through the information reported by the UE, the network side can acquire the current more detailed information of the UE. A typical application example is that: each eNB in the MBSFN area requires the UE which belongs to the eNB to feed back the name of the MBMS service which is being received or is to be received by the UE (the uplink feedback flow is triggered by the eNB), and the UE which is receiving or is going to receive the MBMS service feeds back the identities (such as MBMS service IDs) of the MBMS services, which are being received or is to be received by the UE itself, in the uplink feedback channel.

The transmission of MBMS services is realized by common transmission of the control plane (control signalling) and the user plane data. The control signalling informs the UE of the corresponding control parameters and guides the UE to the corresponding position to receive the interested MBMS service (i.e., corresponding user data) of the UE. In the LTE system, this type of control signalling at least comprises SIB2, SIB13, MCCH information and MCH Scheduling Information (MSI) which is also called Dynamic Scheduling Information (DSI). The MBMS service is transmitted through the MTCH. That is to say, the UE can acquire the control parameters of the interested MBMS service (MTCH) of the UE by obtaining this or these control signalling (SIB2, SIB13, MCCH information and MSI). The UE can receive the MBMS service accurately through these control parameters.

The MCCH, MSI and MTCH are transmitted by taking the MBSFN area as a unit, that is, the MCCH, MSI and MTCH are to be transmitted in the whole MBSFN area, wherein the MCCH, MSI and MTCH are transmitted by utilizing an MBSFN combining technology. The MBSFN combining technology requires multiple base stations/cells under control of the base stations to transmit the same data at the same time-frequency position, in this way, signals transmitted by the multiple base stations/cells under control of the base stations are to be superimposed in the air. In terms of receiving by UE, it is considered that there is only one signal source, which increases the receiving gain and improves the accuracy of received data. While, the SIB2 and SIB13 are transmitted by taking the cell as a unit, that is, the transmitted contents of SIB2 and SIB13 in neighbour cells may be different.

Furthermore, the MBMS control info illation included in the SIB2 will inform the UE of allocation of all the multicast resources in the MBSFN area. That is to say, the UE will obtain the multicast resources corresponding to all the MBMS services in the MBSFN area.

The SIB13 comprises the scheduling information of MCCH information corresponding to the MBSFN area and the scheduling information of notification. That is to say, the UE will acquire, through the SIB13, the related control information, such as time-frequency position at which the MCCH information of the MBSFN area is transmitted, Modulation and Coding Scheme (MCS), and the position for monitoring the notification.

The MCCH information comprises the related control information of the MBSFN area corresponding to the MCCH information. That is to say, the UE can acquire the related control information of the MBSFN area corresponding to the MCCH information by reading the MCCH information, for example, all the ongoing MBMS services (i.e., the MBMS services that are being transmitted by the network side) in the MBSFN area, the control parameters of the ongoing MBMS services and the resource status of the MCH corresponding to the MBMS services. That is to say, by obtaining the MCCH information, the UE acquires one or more MCHs in the MBSFN area, the ongoing MBMS service corresponding to each MCH, and control parameters (such as parameters MBMS-SessionInfo-r9, sessionId-r9, serviceId-r9 and so on) of these ongoing MBMS services.

The DSI information comprises specific resource scheduling information of each MTCH in the MCH. Specifically, because the MCH comprises data of one or more MBMS services (for example, one or more MTCHs), it is needed to specifically specify the physical resources corresponding to a certain MBMS service through MBMS dynamic scheduling information. In this way, when receiving a certain specified MBMS service (for example, the MBMS service MTCH1 in which the UE is interested), the UE acquires the exact resource of the MBMS service through indication of the MBMS dynamic scheduling information, thereby realizing accurate receiving. For other multicast subframes (for example, the multicast subframes bearing services other than MTCH1) in the MCH, the UE keeps silent state and does not receive its subframe information, thereby saving energy consumption of the UE. In the disclosed related art, the resources scheduled or managed by the MBMS dynamic scheduling information is defined as dynamic scheduling period, such as 320 ms or 640 ms, on length of time. FIG. 3 shows a schematic diagram of logical relation between the setting of the schedule block in the dynamic scheduling period and the MBMS service in the related art. The shadow of bold horizontal lines in FIG. 3 represents the schedule block, and other shadows represent different MBMS services, such as the MBMS service A, the MBMS service B and the MBMS service C in the figure. The blank section represents padding or no data. The dynamic scheduling information uniquely locates resources of one MBMS service through the service sequence (LCID parameter) and the sequence number of the last resource where the MBMS service is located (Stop-MTCH parameter). For example, as shown in FIG. 3, the MBMS service sequence is that the first one is the MBMS service A, the second one is the MBMS service B and the third one is the MBMS service C, wherein the sequence number of multicast subframe to which the last service data of the MBMS service A corresponds is #3, the sequence number of multicast subframe to which the last service data of the MBMS service B corresponds is #7, and the sequence number of multicast subframe to which the last service data of the MBMS service C corresponds is #10; in this way, it can be uniquely determined that the resources of the MBMS service A are from #1 to #3, the resources of the MBMS service B are from #3 to #7, and the resources of the MBMS service C are from #7 to #10. In the dynamic scheduling information, each MTCH adopts two parameters, namely Logical Channel ID (LCID) and StopMTCH, to implement the above function.

Regarding a certain specific MBMS service (MTCH) in the MBSFN area, the MBSFN combining technology is adopted in the whole MBSFN area to perform transmission. However, in practical applications, sometimes it is not necessary to transmit a certain MBMS service in the whole MBSFN area, for example, there may be no UE receiving the MBMS service in a certain or some cells in the MBSFN area or the number of users receiving the MBMS service is less than a threshold, then transmission of a certain or some MBMS services of a certain or some cells in the MBSFN area is stopped. FIG. 4 shows a structural diagram of stopping a certain or some MBMS services by the cell. As shown in FIG. 4, the cell 2 in the figure represents that there is stopped MBMS service in the cell. Given that, in the cell 2, there is no UE receiving a certain MBMS service (for example, the MBMS service A) or the number of users receiving the MBMS service is less than the threshold, then transmission of the MBMS service A in the cell 2 is stopped. In this way, the UE residing in the cell 2 will not receive the MBMS service A from the cell 2; that is to say, the UE residing in the cell 2 will not receive the MBMS service A transmitted by the cell 2 since the cell 2 stops transmission of the MBMS service A. In addition, if there are multiple MBSFN services, such as service A, service B, service C, . . . , service N, in the MBSFN area, the cell 2 in FIG. 4 only stops the service A, and the services from B to N are not stopped.

Considering that the MBMS service (for example, the MBMS service A) adopts the MBSFN combining technology to perform synchronous transmission in the whole MBSFN area, although the UE residing in the cell 2 cannot receive the MBMS service A transmitted by the cell 2, it may receive information of the MBMS service A transmitted by the neighbour cells. That is to say, if the UE residing in the cell 2 wants to receive information of the MBMS service A, although it cannot receive the information of the MBMS service A transmitted by the cell 2, it may receive the information of the MBMS service A transmitted by the neighbour cells (for example, the cell 1, the cell 3, the cell 4, the cell 5 and the cell 6) in an MBSFN way. However, the quality of signal received through the neighbour cells is decreased to some extent.

It can be seen that, in the related art, one or more MBMS services can only be started or stopped in the whole MBSFN area, but the starting and stopping of part cells in the MBSFN area cannot be realized. In addition, in the MBSFN area, if the transmission of a certain or some MBMS services in a certain or some cells under control of an eNB or in all cells under control of a certain or some eNBs is stopped, then the transmission of the stopped MBMS service data (MTCH) is not continued in this or these stopped cells. However, regarding the problem that how to transmit the control plane message (control signalling) on this or these stopped cells, no corresponding solution is provided at present.

SUMMARY OF THE INVENTION

In view of the above, the present invention provides a method and a device for transmitting multimedia broadcast multicast service control information, thereby enabling the control signalling to be normally transmitted in the MBSFN area, not influencing the original MBSFN combining mechanism of the control signalling, and realizing effective receiving of the MBMS control plane message (control signalling) by the UE. Furthermore, the UE can acquire the specific MBMS services transmitted by the cell through the effective indication of system information (SIB13), so that the reliability of receiving the MBMS services by the UE is improved.

The technical solution of the present invention is realized as follows.

A method for transmitting multimedia broadcast multicast service control information comprises:

a base station stopping transmission of an MBMS service in a cell, and transmitting control plane information of the MBMS service in the cell in which the MBMS service is stopped, wherein in the control plane information, contents of an SIB2, MCCH information and DSI remain unmodified, and contents of an SIB13 are modified or remain unmodified.

Preferably, the step of the base station stopping the MBMS service in the cell comprises:

the base station determining whether to stop the transmission of the MBMS service according to at least one of the following conditions: an uplink feedback of a UE which belongs to the cell, radio resources occupied by a non-MBMS service in the cell, an indication of an MCE and a request from an Operation, Administration and Management (OAM) system.

Preferably, the contents of the SIB2 remaining unmodified comprises: after the base station stops the transmission of the MBMS service, allocation of multicast resources in a Multicast Broadcast Single Frequency Network (MBSFN) area corresponding to the stopped MBMS service remaining unmodified;

the contents of the MCCH information remaining unmodified comprises: the MCCH information still comprising related information about the stopped MBMS service; and the contents of the DSI remaining unmodified comprises: the MCCH information still comprising related information about the stopped MBMS service.

Preferably, the contents of the MCCH information remaining unmodified comprises: the MCCH information still comprising session information MBMS-SessionInfo, session identity sessionId and service identity serviceId of the stopped MBMS service; and the contents of the DST remaining unmodified comprises: the MCCH information still comprising parameters as follows: LCID and Stop Multicast Traffic Channel (STOP MTCH) of the stopped MBMS service.

Preferably, the contents of the SIB13 remaining unmodified comprises: both scheduling information of an MCCH and scheduling information of notification remaining unmodified, and no new control information being added in the SIB13;

the contents of the SIB13 being modified comprises: original scheduling information of an MCCH and scheduling information of notification in the SIB13 remaining unmodified, and indication information of the stopped MBMS service in the cell being added in the contents of the SIB13, wherein the indication information comprises identity information of the stopped MBMS service in the cell.

Preferably, the identity information of the stopped MBMS service comprises service ID or LCID.

A device for transmitting multimedia broadcast multicast service control information comprises a service stopping unit and a transmitting unit, wherein the service stopping unit is configured to stop transmission of an MBMS service in a cell;

the transmitting unit is configured to transmit control plane information of the MBMS service in the cell in which the MBMS service is stopped, wherein in the transmitted control plane information, contents of an SIB2, MCCH information and DSI remain unmodified, and contents of an SIB13 are modified or remain unmodified.

Preferably, the service stopping unit is further configured to determine whether to stop the transmission of the MBMS service according to at least one of the following conditions: an uplink feedback of a UE which belongs to the cell, radio resources occupied by a non-MBMS service in the cell, an indication of an MCE and a request from an OAM system.

Preferably, the contents of the SIB2 remaining unmodified comprises: after the base station stops the transmission of the MBMS service, allocation of multicast resources in an MBSFN area corresponding to the stopped MBMS service remaining unmodified;

the contents of the MCCH information remaining unmodified comprises: the MCCH information still comprising related information about the stopped MBMS service, the MCCH information still comprising MBMS-SessionInfo, sessionId and serviceId of the stopped MBMS service; and the contents of the DSI remaining unmodified comprises: the MCCH information still comprising related information about the stopped MBMS service, and the MCCH information still comprising parameters as follows: LCID and STOP MTCH of the stopped MBMS service.

Preferably, the contents of the SIB13 remaining unmodified comprises: both scheduling information of an MCCH and scheduling information of notification remaining unmodified, and no new control information being added in the SIB13;

the contents of the SIB13 being modified comprises: original scheduling information of the MCCH and scheduling information of notification in the SIB13 remaining unmodified, and indication information of the stopped MBMS service in the cell being added in the contents of the SIB13, wherein the indication information comprises identity information of the stopped MBMS service in the cell.

Preferably, the identity information of the stopped MBMS service comprises service ID or LCID.

In the present invention, for the number of users receiving a certain MBMS service is less than a set threshold or for some other reasons, the base station stops the MBMS service; when transmitting the control plane information of the MBMS service, the SIB2 contents, the MCCH information contents and the DSI contents remain unmodified, and the SIB13 in the transmitted control plane information is modified or unmodified. In this way, the normal transmission of control signalling in the MBSFN area can be ensured, the original MBSFN combining mechanism of the control signalling is not influenced, and effective receiving of the MBMS control plane information (control signalling) by the UE is realized. Furthermore, the UE can acquire the specific MBMS services transmitted by the cell through the effective indication of system information, so that the reliability of receiving the MBMS services by the UE is improved.

DETAILED DESCRIPTION OF THE EMBODIMENTS

Figure 1:
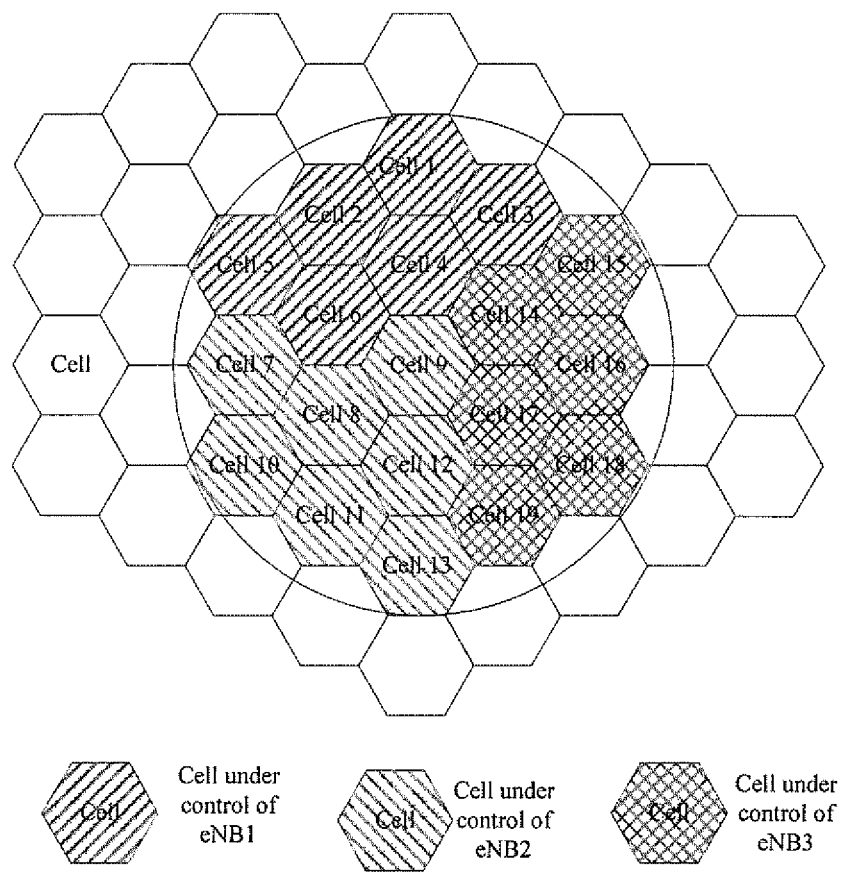
FIG. 1 shows a structural diagram of a MBSFN area in the related art.
Figure 2:
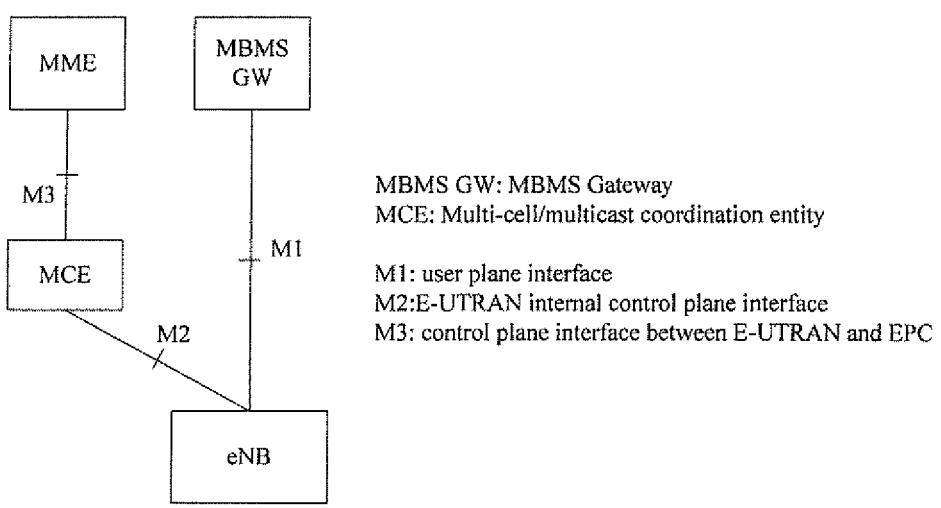
FIG. 2 shows a logical diagram of an MBMS service bearing architecture in the related art.
Figure 3:
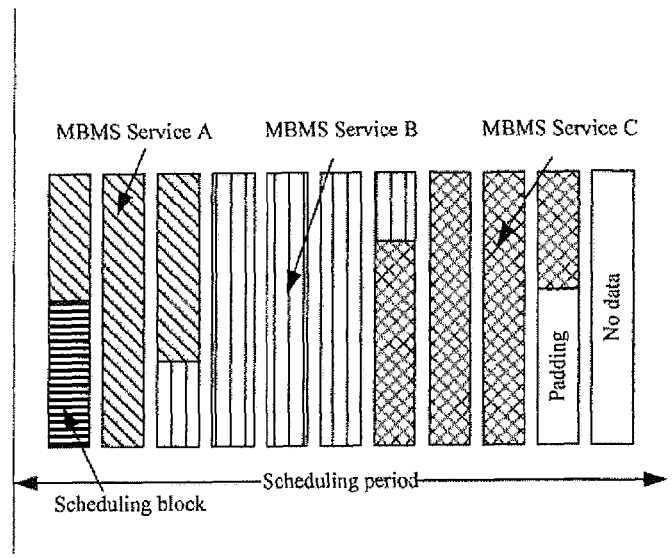
FIG. 3 shows a schematic diagram of logical relation between the setting of the schedule block in the dynamic scheduling period and the MBMS service in the related art.
Figure 4:
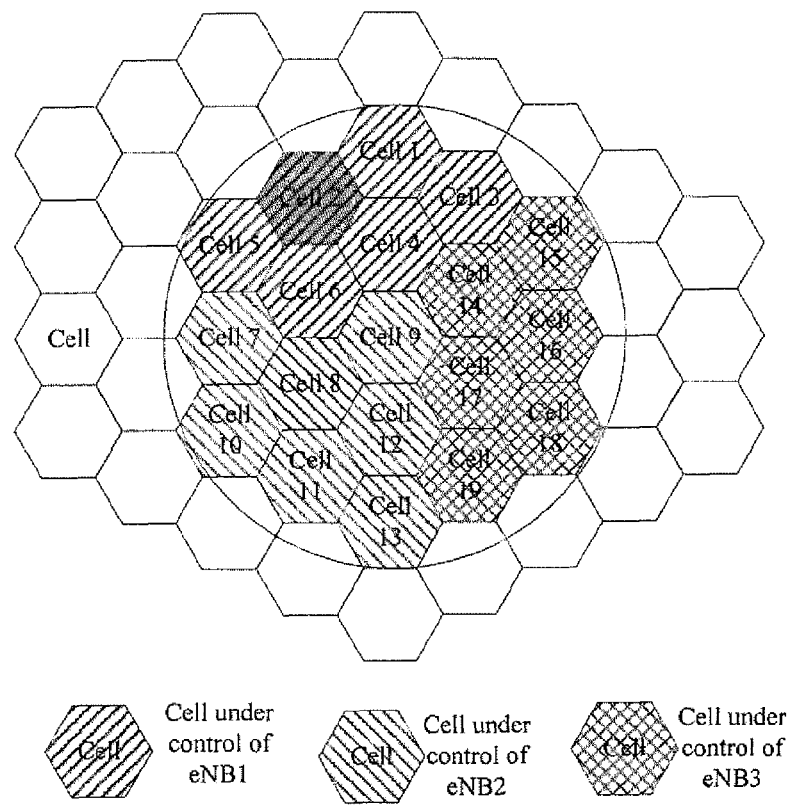
FIG. 4 shows a structural diagram of stopping a certain or some MBMS services in the cell.

The basic idea of the embodiments of the present invention is that: in the MBSFN area, after a certain or some MBMS services of a certain cell are stopped, during transmission of the control plane information (or called control signalling), the SIB2 contents, the MCCH information contents and the DSI contents should remain unmodified, and the SIB13 in the transmitted control plane information is modified or unmodified. Here, stopping a certain or some MBMS services of a certain cell means that the cell determines to stop transmission of a certain or some MBMS services in the cell, according to one or more of the determining conditions which comprise an uplink feedback of a UE which belongs to the cell, radio resources occupied by non-MBMS services in the cell, an indication of an MCE and a request from an OAM system. For example, there may be no UE receiving the MBMS service or the number of users receiving the MBMS service is less than a threshold in a certain or some cells in the MBSFN area, then transmission of a certain or some MBMS services of a certain or some cells in the MBSFN area are stopped. Data of the certain or some MBMS services being stopped have reached each cell or the eNB that the cell belongs to, but are not transmitted at wireless side (or air interface). With regard to how to determine the MBMS services to be stopped, details are available from related records in a patent application document that the applicant applied on May 19, 2010, and the title of the patent application document is Method and System for Realizing MBMS Service Scheduling.

In order to make the technical solution and advantages of the present invention more clear, the present invention is described below with reference to the accompanying drawings and embodiments in detail.

In the embodiment of the present invention, after the cell stops a certain or some MBMS services transmitted by the cell, the SIB2 contents are unmodified, which means that stopping the MBMS service will not influence the configuration of original multicast resources. That is to say, the multicast resources corresponding to the stopped MBMS services are not released or re-configured. Likewise, the contents included in SIB2 will not be modified either.

In the embodiment of the present invention, after the cell stops a certain or some MBMS services transmitted by the cell, the SIB13 contents are processed according to the following solution:

a) the SIB13 contents are unmodified: specifically, the scheduling information (comprising MCCH MCS, MCCH time-frequency domain resource and position thereof and so on) of the MCCH and the scheduling information (comprising time domain position of notification and so on) of notification remain unmodified;

b) the SIB13 contents are modified: specifically, the original contents (the scheduling information (comprising MCCH MCS, MCCH time-frequency domain resource and position thereof and so on) of the MCCH and the scheduling information (comprising time domain position of notification and so on) of notification) in SIB13 remain unmodified, and indication information of the stopped MBMS service in the cell is added in the SIB13 contents, wherein the indication information can be either a set or a list, and comprises information of the stopped MBMS service in the cell (for example, identities that can uniquely identify the MBMS service, such as service ID or LCID or other identities of the stopped MBMS service). In other words, the UE can acquire, by receiving the information of SIB13, the scheduling information of the MCCH, the scheduling information of the notification and information of the MBMS service, the transmission of which is stopped in the cell.

In the embodiment of the present invention, after the cell stops a certain or some MBMS services transmitted by the cell, the MCCH information contents remain unmodified, which means the MCCH information will comprise related information (for example, the scheduling information of the MBMS service) about the MBMS service, the transmission of which is stopped. In other words, the UE still can acquire, through the MCCH information, related information (for example, the scheduling information of the MBMS service) about the MBMS service, the transmission of which is stopped. From another point of view, in the MBSFN area, the MCCH information will be transmitted in the MBSFN combining way, which means transmission of the MCCH information is required to ensure that all the eNBs and cells in the MBSFN area transmit the same content on the same time-frequency resource. Therefore, after the cell stops a certain or some MBMS services transmitted by the cell, the MCCH information in the cell being unmodified meets the requirement of adopting the MBSFN combining way to transmit the MCCH information, and does not influence the transmission of the MCCH contents in the whole MBSFN area. If the MCCH information contents are modified (for example, considering influence from the cell stopping the MBMS service, the related information corresponding to the stopped MBMS service is deleted from the MCCH information), at this time, in the MBSFN area, two or more kinds of MCCH information contents are found at the same time-frequency resource position, which will not meet the MBSFN transmission combining way. Besides, the UE will receive signals of two or more kinds of MCCH information contents at the same time-frequency resource position; the signals of the two or more kinds of MCCH information contents will become strong interference information of each other, which is a very severe interference for receiving the MCCH information by the UE, and will directly cause failure of receiving the MCCH information.

In the embodiment of the present invention, after the cell stops a certain or some MBMS services transmitted by the cell, the DSI information contents remain unmodified, which means the DSI information will comprise related information (for example, the dynamic scheduling information of the MBMS service, the transmission of which is stopped) about the MBMS service, the transmission of which is stopped, and the sequence of the MBMS service, the transmission of which is stopped, in the DSI will remain unmodified, too. That is to say, the DSI information contents will keep the same as that before stopping a certain or some MBMS services, specifically, the specific scheduling sequence of the MBMS services in the DSI information remains unmodified, too. From another point of view, in the MBSFN area, the DSI information will be transmitted in the MBSFN combining way, which means the transmission of the DSI information is required to ensure that all the eNBs and cells in the MBSFN area transmit the same content on the same time-frequency resource. Thus, after the cell stops a certain or some MBMS services transmitted by the, the DSI information in the cell is unmodified, so the requirement of adopting the MBSFN combining way to transmit the DSI information is met, and the transmission of the DSI contents in the whole MBSFN area is not influenced. If the DSI information contents are modified (for example, considering influence from the cell stopping the MBMS service, the related information corresponding to the stopped MBMS service is deleted from the DSI information or the original scheduling sequence of the MBMS services in the DSI information is modified), at this time, in the MBSFN area, two or more kinds of DSI information contents are found at the same time-frequency resource position, which will not meet the MBSFN transmission combining way. Besides, the UE will receive signals of two or more kinds of DSI information contents at the same time-frequency resource position; the signals of the two or more kinds of DSI information contents will become strong interference information of each other, which is a very severe interference for receiving the DSI information by the UE, and will directly cause failure of receiving the DSI information.

The present invention is described below with reference to embodiments for better description.

Embodiment 1

Figure 5:
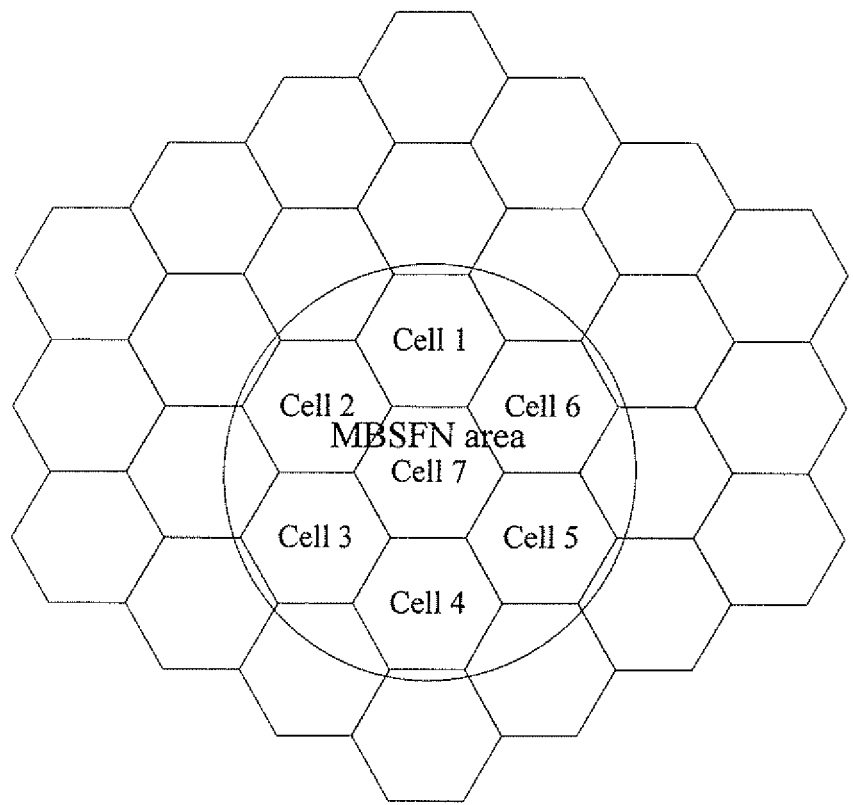
FIG. 5 shows a structural diagram of a MBSFN area in embodiment 1 of the present invention.
Figure 6:
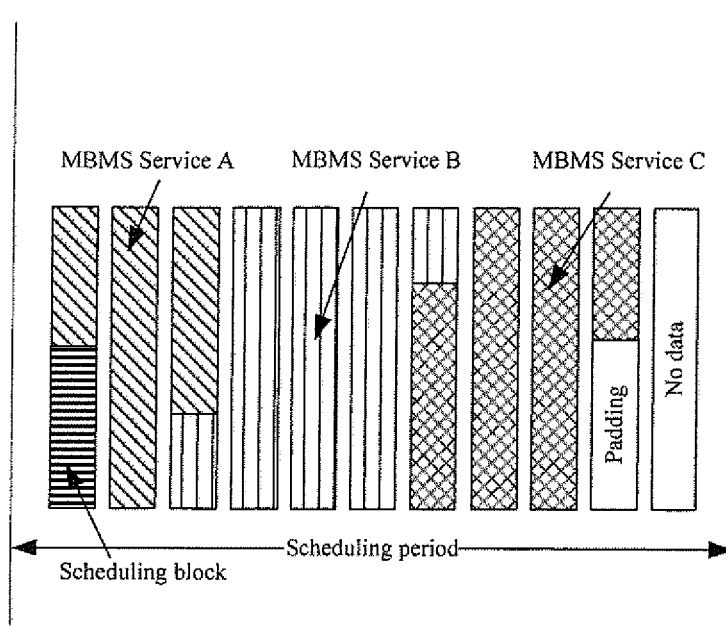
FIG. 6 shows a structural diagram of radio resource bearing of the MBMS services in embodiment 1 of the present invention.

FIG. 5 shows a structural diagram of a MBSFN area in embodiment 1 of the present invention. As shown in FIG. 5, the MBSFN area is composed of 7 cells, and the MBSFN area bears 3 MBMS services which are MBMS service A, MBMS service B and MBMS service C, respectively, wherein for simplicity, it is supposed that the 3 MBMS services are in ongoing state, FIG. 6 shows a structural diagram of radio resource bearing of the MBMS services in embodiment 1 of the present invention. As shown in FIG. 6, in one scheduling period, the 3 services are correspondingly born on the same MCH, and the specific bearing mode is shown in FIG. 6. The following describes how the system side transmits the control plane signalling.

Regarding the SIB2 contents (considering the SIB2 comprises a large number of control parameters, only the parameters related to the MBMS service bearing are listed here), it is specifically as follows:

{
    multicast resource scheduling information in MBSFN area
    (radioframeAllocationPeriod, radioframeAllocationOffset,
    subframeAllocation)
}

Through the above parameters, the UE will acquire the allocation of all multicast resources in the MBSFN area; that is to say, the UE will acquire the multicast resources corresponding to the MBMS services in the MBSFN area.

Regarding the SIB13 contents, it is specifically as follows:

{
    scheduling information of MCCH (mcch-Config-r9);
    scheduling information of notification (notificationIndicator-r9);
}

Through the parameters of SIB13, the UE will acquire the scheduling information of the MCCH information corresponding to the MBSFN area, that is to say, the UE will acquire the corresponding MCS and at what time-frequency position the MCCH information is transmitted. Besides, the UE will also acquire the scheduling information of notification, that is, where can the UE receive the notification information.

Regarding the MCCH information contents, it is specifically as follows:

{
list of all MBMS services which are being transmitted in the MBSFN area
(namely, MBMS services which have been subjected to session start);
{
MBMS service A (serviceId-r9, sessionId-r9, logicalChannelIdentity-r9);
MBMS service B (serviceId-r9, sessionId-r9, logicalChannelIdentity-r9);
MBMS service C (serviceId-r9, sessionId-r9, logicalChannelIdentity-r9);
}
}

Through the MCCH information contents, the UE will acquire the list of MBMS services which are being transmitted in the MBSFN area. Specifically, there will be one set of parameters, for representing each MBMS service which are being transmitted in the list, in the MCCH information, wherein the parameters comprise serviceId-r9, sessionId-r9 and logicalChannelIdentity-r9. According to the embodiment 1, the MCCH information will comprise the parameters of MBMS service A, MBMS service B and MBMS service C. The UE can acquire the 3 services which are being transmitted in the MBSFN area through the MCCH information, and specific parameters of each MBMS service.

Regarding the DSI information contents, it is specifically as follows:

the DSI information will specify the specific multicast resource positions of the MBMS services which are being transmitted, specifically, the dynamic scheduling information will specify the specific multicast resource position of each MBMS service which is being transmitted. It can been seen from FIG. 6 that the dynamic scheduling information specifies the multicast subframes corresponding to the MBMS service A are subframes #1, #2 and #3, the multicast subframes corresponding to the MBMS service B are subframes from #3 to #7, and the multicast subframes corresponding to the MBMS service C are subframes from #7 to #10, wherein the dynamic scheduling information is identified through the two parameters, namely LCID and stop MTCH.

As shown in FIG. 5, suppose that the cell 7 will stop transmission of the MBMS service B, after the cell 7 stops the MBMS service B, the control plane signalling will be transmitted in the following way: the SIB2 contents are unmodified; the SIB13 contents are unmodified; the MCCH information contents are unmodified; and the DSI information contents are unmodified.

Embodiment 2

Figure 7:
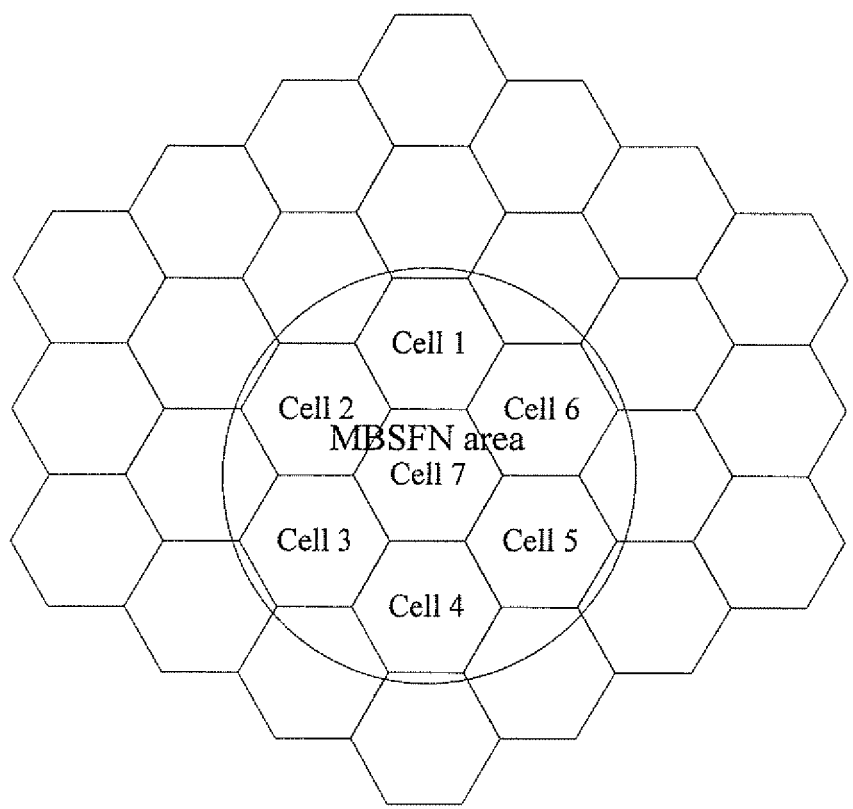
FIG. 7 shows a structural diagram of a MBSFN area in embodiment 2 of the present invention.
Figure 8:
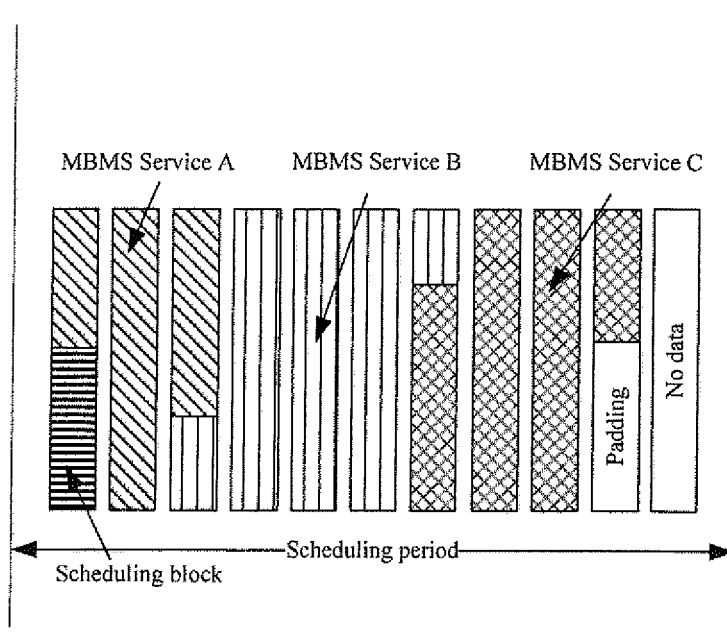
FIG. 8 shows a structural diagram of radio resource bearing of the MBMS services in embodiment 2 of the present invention.

FIG. 7 shows a structural diagram of a MBSFN area in embodiment 2 of the present invention. As shown in FIG. 7, suppose that the MBSFN area is composed of 7 cells, and the MBSFN area bears 3 MBMS services which are MBMS service A, MBMS service B and MBMS service C, respectively, wherein for simplicity, it is supposed that the 3 MBMS services are in ongoing state. FIG. 8 shows a structural diagram of radio resource bearing of the MBMS services in embodiment 2 of the present invention. As shown in FIG. 8, suppose the 3 services correspond to the same MCH and are correspondingly born on the same MCH, and the specific bearing mode is shown in FIG. 8. The following describes how the system side transmits the control plane signalling.

Regarding the SIB2 contents (considering the SIB2 comprises a large number of control parameters, only the parameters related to the MBMS service bearing are listed here), it is specifically as follows:

```
{
    multicast resource scheduling information in MBSFN area
    (radioframeAllocationPeriod, radioframeAllocationOffset,
    subframeAllocation)
}
```

Through the above parameters, the UE will acquire the allocation of all multicast resources in the MBSFN area; that is to say, the UE will acquire the multicast resources corresponding to the MBMS services in the MBSFN area.

Regarding the SIB13 contents, it is specifically as follows:

```
{
    scheduling information of MCCH (mcch-Config-r9);
    scheduling information of notification (notificationIndicator-r9);
}
```

Through the parameters of SIB13, the UE will acquire the scheduling information of the MCCH information corresponding to the MBSFN area, that is to say, the UE will acquire the corresponding MCS and at what time-frequency position the MCCH information is transmitted. Besides, the UE will also acquire the scheduling information of notification, that is, where can the UE receive the notification information.

Regarding the MCCH information contents, it is specifically as follows:

```
{
    list of all MBMS services which are being transmitted in the MBSFN area
    (namely, MBMS services which have been subjected to session start);
    {
        MBMS service A (serviceId-r9, sessionId-r9, logicalChannelIdentity-r9);
        MBMS service B (serviceId-r9, sessionId-r9, logicalChannelIdentity-r9);
        MBMS service C (serviceId-r9, sessionId-r9, logicalChannelIdentity-r9);
    }
}
```

Through the MCCH information contents, the UE will acquire the list of MBMS services which are being transmitted in the MBSFN area. Specifically, there will be one set of parameters, for representing each MBMS service which are being transmitted in the list, in the MCCH information, wherein the parameters comprise serviceId-r9, sessionId-r9 and logicalChannelIdentity-r9. According to the embodiment 1, the MCCH information will comprise the parameters of MBMS service A, MBMS service B and MBMS service C. The UE can acquire the 3 services which are being transmitted in the MBSFN area through the MCCH information, and specific parameters of each MBMS service.

Regarding the DSI information contents, it is specifically as follows:

the DSI information will specify the specific multicast resource positions of the MBMS services which are being transmitted, specifically, the dynamic scheduling information will specify the specific multicast resource position of each MBMS service which is being transmitted. It can been seen from FIG. 6 that the dynamic scheduling information specifies the multicast subframes corresponding to the MBMS service A are subframes #1, #2 and #3, the multicast subframes corresponding to the MBMS service B are subframes from #3 to #7, and the multicast subframes corresponding to the MBMS service C are subframes from #7 to #10, wherein the dynamic scheduling information is identified through the two parameters, namely LCID and stop MTCH.

As shown in FIG. 7, the cell 7 will stop transmission of the MBMS service B. After the cell 7 stops the MBMS service B, transmission of the control plane signalling is performed in the following manner: the SIB2 contents remain unmodified, the MCCH information contents remain unmodified, the DSI information contents remain unmodified, and the SIB13 contents are modified. Specifically, indication of the MBMS service, the transmission of which is stopped in the cell 7, is added in the original SIB13 contents; that is to say, indication information is added in the SIB13 for indicating that transmission of the MBMS service B has been stopped in the cell 7. The modified SIB13 is specifically as follows:

```
{
    scheduling information of MCCH (mcch-Config-r9);
    scheduling information of notification (notificationIndicator-r9);
    list of MBMS services, the transmission of which has been stopped;
}
```

Through the parameters of SIB13, the UE will acquire the scheduling information of MCCH information corresponding to the MBSFN area, that is to say, the UE will acquire the corresponding MCS and at what time-frequency position the MCCH information is transmitted. Besides, the UE will also acquire the scheduling information of notification, that is, where can the UE receive the notification information. At the same time, through the list of MBMS services, the transmission of which has been stopped, the UE can acquire the list of MBMS services, the transmission of which has been stopped in the cell.

With the method of the embodiments of the present invention, the control signalling can be normally transmitted in the MBSFN area, the original MBSFN combining mechanism of control signalling is not influenced, and an effective method for receiving the MBMS control plane information (control signalling) by the UE is realized. Furthermore, the UE can acquire the specific MBMS services transmitted by the cell through the effective indication of system information, so that the reliability of receiving MBMS services by the UE is improved.

Figure 9:
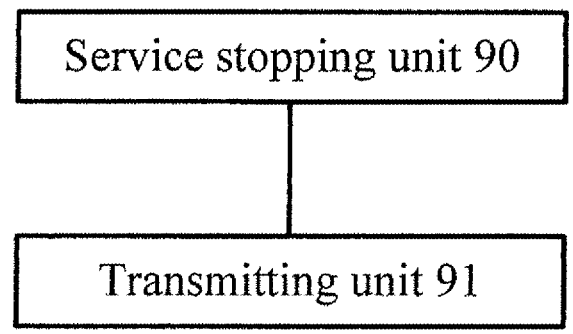
FIG. 9 shows a structural diagram of a device for transmitting multimedia broadcast multicast service control information in an embodiment of the present invention.

FIG. 9 shows a structural diagram of a device for transmitting multimedia broadcast multicast service control information in an embodiment of the present invention. As shown in FIG. 9, the device for transmitting multimedia broadcast multicast service control information in an embodiment of the present invention comprises a service stopping unit 90 and a transmitting unit 91, wherein the service stopping unit 90 is configured to stop transmission of an MBMS service in a cell; and the transmitting unit 91 is configured to transmit control plane information of the MBMS service in the cell in which the MBMS service is stopped, wherein in the transmitted control plane information, SIB2 contents, MCCH information contents DSI contents remain unmodified, and SIB13 contents in the transmitted control plane information are modified or remain unmodified.

Preferably, the service stopping unit is further configured to determine whether to stop transmission of the MBMS service according to at least one of the conditions which comprise an uplink feedback of a UE which belongs to the cell, radio resource occupied by a non-MBMS service in the cell, an indication of an MCE and a request from an OAM system.

The SIB2 contents remaining unmodified comprises: after the base station stops the transmission of the MBMS service, allocation of multicast resources in an MBSFN area corresponding to the stopped MBMS service remaining unmodified.

The MCCH information contents remaining unmodified comprises: the MCCH information still comprising related information about the stopped MBMS service, the MCCH information still comprising MBMS-SessionInfo, sessionId and serviceId of the stopped MBMS service.

The DSI contents remaining unmodified comprises: the MCCH information still comprising related information about the stopped MBMS service, and the MCCH information still comprising parameters as follows: LCID and STOP MTCH of the stopped MBMS service.

The SIB13 contents remaining unmodified comprises: both scheduling information of an MCCH and scheduling information of notification remaining unmodified, and no new control information being added in the SIB13;

the SIB13 contents being modified comprises: original scheduling information of the MCCH and scheduling information of notification in the SIB13 remaining unmodified, and indication information of the stopped MBMS service in the cell being added in the contents of the SIB13, wherein the indication information comprises identity information of the stopped MBMS service in the cell.

The identity information of the stopped MBMS service comprises service ID or LCID.

Those skilled in the art should understand that the device for transmitting multimedia broadcast multicast service control information in the embodiments of the present invention is designed for implementing the above-mentioned method for transmitting multimedia broadcast multicast service control information in the embodiments of the present invention, and the functions implemented by each processing unit can be understood with reference to the above related description of the method. The functions of each processing unit in accompanying drawings can be implemented either through the programs running on a processor, or through specific logical circuits.

The above are only preferable embodiments of the present invention, and not used for limiting the scope of protection of the present invention.

What is claimed is:

1. A method for transmitting multimedia broadcast multicast service control information, comprising:

a base station stopping transmission of a Multimedia Broadcast Multicast Service (MBMS) service in a cell, and transmitting control plane information of the MBMS service in the cell in which the MBMS service is stopped, wherein in the control plane information, contents of a System Information Block (SIB) 2, Multimedia Control Channel (MCCH) information and Dynamic Scheduling Information (DSI) remain unmodified, and contents of an SIB13 are modified or remain unmodified, wherein the contents of the SIB2 remaining unmodified comprises: after the base station stops the transmission of the MBMS service, allocation of multicast resources in a Multicast Broadcast Single Frequency Network (MBSFN) area corresponding to the stopped MBMS service remaining unmodified; the contents of the MCCH information remaining unmodified comprises: the MCCH information still comprising related information about the stopped MBMS service; and the contents of the DSI remaining unmodified comprises: the MCCH information still comprising related information about the stopped MBMS service.

2. The method according to claim 1, wherein the step of the base station stopping the MBMS service in the cell comprises:

the base station determining whether to stop the transmission of the MBMS service according to at least one of the following conditions: an uplink feedback of a User Equipment (UE) which belongs to the cell, radio resources occupied by a non-MBMS service in the cell, an indication of a Multi-cell/multicast Coordination Entity (MCE) and a request from an Operation, Administration and Management (OAM) system.

3. The method according to claim 2, wherein the contents of the SIB 13 remaining unmodified comprises: both scheduling information of an MCCH and scheduling information of notification remaining unmodified, and no new control information being added in the SIB13;

the contents of the SIB13 being modified comprises: original scheduling information of an MCCH and scheduling information of notification in the SIB 13 remaining unmodified, and indication information of the stopped MBMS service in the cell being added in the contents of the SIB13, wherein the indication information comprises identity information of the stopped MBMS service in the cell.

4. The method according to claim 3, wherein the identity information of the stopped MBMS service comprises service ID or LCID.

5. The method according to claim 1, wherein the contents of the MCCH information remaining unmodified comprises: the MCCH information still comprising session information MBMS-SessionInfo, session identity sessionId and service identity serviceId of the stopped MBMS service; and the contents of the DSI remaining unmodified comprises: the MCCH information still comprising parameters as follows: Logical Channel ID (LCID) and Stop Multicast Traffic Channel (STOP MTCH) of the stopped MBMS service.

6. The method according to claim 5, wherein the contents of the SIB 13 remaining unmodified comprises: both scheduling information of an MCCH and scheduling information of notification remaining unmodified, and no new control information being added in the SIB 13;

the contents of the SIB 13 being modified comprises: original scheduling information of an MCCH and scheduling information of notification in the SIB 13 remaining unmodified, and indication information of the stopped MBMS service in the cell being added in the contents of the SIB 13, wherein the indication information comprises identity information of the stopped MBMS service in the cell.

7. The method according to claim 6, wherein the identity information of the stopped MBMS service comprises service ID or LCID.

8. The method according to claim 1, wherein the contents of the SIB 13 remaining unmodified comprises: both scheduling information of an MCCH and scheduling information of notification remaining unmodified, and no new control information being added in the SIB 13;

the contents of the SIB 13 being modified comprises: original scheduling information of an MCCH and scheduling information of notification in the SIB13 remaining unmodified, and indication information of the stopped MBMS service in the cell being added in the contents of the SIB13, wherein the indication information comprises identity information of the stopped MBMS service in the cell.

9. The method according to claim 8, wherein the identity information of the stopped MBMS service comprises service ID or LCID.

10. A device for transmitting multimedia broadcast multicast service control information, comprising a service stopping unit and a transmitting unit, wherein the service stopping unit is configured to stop transmission of an MBMS service in a cell;

the transmitting unit is configured to transmit control plane information of the MBMS service in the cell in which the MBMS service is stopped, wherein in the transmitted control plane information, contents of an SIB2, MCCH information and DSI remain unmodified, and contents of an SIB13 are modified or remain unmodified, wherein the contents of the SIB2 remaining unmodified comprises: after the base station stops the transmission of the MBMS service, allocation of multicast resources in an MBSFN area corresponding to the stopped MBMS service remaining unmodified; the contents of the MCCH information remaining unmodified comprises: the MCCH information still comprising related information about the stopped MBMS service; and the contents of the DST remaining unmodified comprises: the MCCH information still comprising related information about the stopped MBMS service.

11. The device according to claim 10, wherein the service stopping unit is further configured to determine whether to stop the transmission of the MBMS service according to at least one of the following conditions: an uplink feedback of a UE which belongs to the cell, radio resources occupied by a non-MBMS service in the cell, an indication of an MCE and a request from an OAM system.

12. The device according to claim 11, wherein the contents of the SIB 13 remaining unmodified comprises: both scheduling information of an MCCH and scheduling information of notification remaining unmodified, and no new control information being added in the SIB 13;

the contents of the SIB 13 being modified comprises: original scheduling information of the MCCH and scheduling information of notification in the SIB 13 remaining unmodified, and indication information of the stopped MBMS service in the cell being added in the contents of the SIB 13, wherein the indication information comprises identity information of the stopped MBMS service in the cell.

13. The device according to claim 12, wherein the identity information of the stopped MBMS service comprises service ID or LCID.

14. The device according to claim 10, wherein the contents of the MCCH information remaining unmodified comprises: the MCCH information still comprising MBMS-SessionInfo, sessionId and serviceId of the stopped MBMS service; and the contents of the DSI remaining unmodified comprises: the MCCH information still comprising parameters as follows: LCID and STOP MTCH of the stopped MBMS service.

15. The device according to claim 14, wherein the contents of the SIB 13 remaining unmodified comprises: both scheduling information of an MCCH and scheduling information of notification remaining unmodified, and no new control information being added in the SIB 13;

the contents of the SIB 13 being modified comprises: original scheduling information of the MCCH and scheduling information of notification in the SIB 13 remaining unmodified, and indication information of the stopped MBMS service in the cell being added in the contents of the SIB13, wherein the indication information comprises identity information of the stopped MBMS service in the cell.

16. The device according to claim 15, wherein the identity information of the stopped MBMS service comprises service ID or LCID.

17. The device according to claim 10, wherein the contents of the SIB 13 remaining unmodified comprises: both scheduling information of an MCCH and scheduling information of notification remaining unmodified, and no new control information being added in the SIB13;

the contents of the SIB 13 being modified comprises: original scheduling information of the MCCH and scheduling information of notification in the SIB 13 remaining unmodified, and indication information of the stopped MBMS service in the cell being added in the contents of the SIB13, wherein the indication information comprises identity information of the stopped MBMS service in the cell.

18. The device according to claim 17, wherein the identity information of the stopped MBMS service comprises service ID or LCID.

* * * * *